2,961,372
Patented Nov. 22, 1960

2,961,372
PESTICIDE

Jamal S. Eden, Akron, Ohio, assignor to Diamond Alkali Company, Cleveland, Ohio, a corporation of Delaware No Drawing. Filed Apr. 29, 1959, Ser. No. 809,603

5 Claims. (Cl. 167—30)

This is a continuation-in-part of my co-pending application Ser. No. 614,090, filed October 5, 1956, now abandoned.

This invention relates to novel alkylaminophenoxy-2-propanols.

More specifically, the present invention relates to novel compounds having the following structure

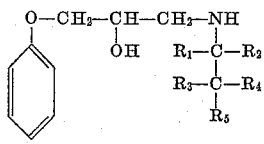

wherein $R_1$, $R_2$, $R_3$, $R_4$, and $R_5$ are selected from the group consisting of hydrogen and lower alkyl radicals, at least one of the R's being a lower alkyl radical.

More particularly the present invention contemplates as novel compounds the following:

1-sec. butylamino-3-phenoxy-2-propanol

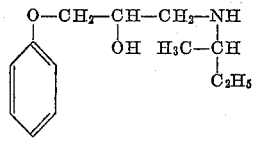

1-(2-ethylhexylamino)-3-phenoxy-2-propanol

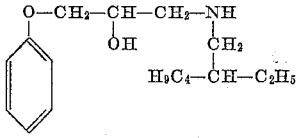

Compounds of this invention are generally useful as biologically active materials such as insecticides, fungicides, bactericides and the like, as well as chemical intermediates for the preparation of other substances.

Compounds of the above type generally can be prepared by combining an appropriate phenyl ether such as glycidyl phenyl ether with an alkyl amine such as a lower alkyl amine, e.g., 2-ethylhexyl amine or sec. butyl amine. The reaction may be carried out at an elevated temperature from about 1 to 5 hours followed by cooling and separation of the desired product, e.g., by vacuum distillation.

Compounds of this invention may be employed in a variety of biologically active and other formulations, both liquid and solid, including finely-divided powders, granular materials, as well as various liquid solutions, concentrates, emulsifiable concentrates, slurries and the like, depending upon the application intended and the formulation media employed.

Accordingly, it will be appreciated that it is contemplated that the practice of this invention includes the preparation and use of biologically active compositions containing as essential active substances compounds of this invention which compositions also may include diluents, extenders, fillers, conditioners, solvents, and the like, such as various clays, diatomaceous earth, talc, spent catalyst, alumina silica materials as well as such liquids as water and various organic liquids such as acetone, kerosene, benzene, toluene, xylene and other petroleum distillate fractions or mixtures thereof. When liquid formulations are employed, and dry materials prepared which are to be used in liquid form, it is desirable in certain instances additionally to employ a wetting, emulsifying or dispersing agent to facilitate use of the formulation, e.g., Triton X-155 (alkyl aryl polyether alcohol).

In order that those skilled in the art may more completely understand the present invention and the preferred methods by which the same may be carried into effect, the following specific examples are offered:

EXAMPLE I

Part A

Preparation of 1-sec. butylamino-3-phenoxy-2-propanol

To 2.0 mols (126.0 gm.) of boiling sec. butylamine, 1.0 mol (150.2 gm.) of glycidyl phenyl ether is added slowly over a period of 2½ hours. After all of the glycidyl phenyl ether is added, refluxing is continued for an additional two hours at which time the reaction product is solidified by cooling to room temperature. The solid is recovered by filtration and weighs 221 gms. (theoretical yield 223 gm.). A portion of the solid is recrystallized twice from hexane to yield a white solid melting at 75–77° C. Chemical analysis of this product is as follows indicating formation of the desired $C_{13}H_{21}NO_2$.

| Element | Percent Actual | Percent Calculated |
|---|---|---|
| C | 70.15 | 70.0 |
| H | 9.53 | 9.4 |
| N | 6.48 | 6.28 |

Part B

To illustrate biological activity of a compound of this invention, the product of Part A is employed in a test to determine its effectiveness as a means for controlling early blight on tomatoes caused by the fungi *Alternaria solani*. In this test, tomato plants (var. Bonny Best) 5 to 7 inches high are sprayed with 100 ml. of the test formulation of 1-sec. butylamino-3-phenoxy-2-propanol; 2000 p.p.m. in water containing 5% acetone and 0.01% Triton X-155 as an emulsifier. After the spray deposit is dry, the treated plants, and comparable untreated controls sprayed with the formulation less the toxicant are sprayed with a spore suspension containing approximately 20,000 conidia of *Alternaria solani* per ml. The thus-treated plants are held at 100% relative humidity for 24 hours at 70° F. and are then removed to a greenhouse. After 2–4 days, lesion counts are made on the 3 uppermost fully expanded leaves. The data thus obtained are converted to percentage disease control based on the number of lesions on the control plants. As a result of this procedure, it is observed that a 100% control of the early blight fungus is observed using the product of Part A.

Part C

To indicate insecticidal activity of the product of Part A test are conducted against the Mexican bean beetle by employing the product of Part A (25% wettable powder dispersed in water at a concentration of 1% actual chemical) by dipping cranberry bean plants therein. After the thus-treated plants are dry, untreated insects are caged thereon. A 90% insect mortality is observed 48 hours after treatment, thus indicating a high degree of insecticidal activity.

EXAMPLE II

Part A

PREPARATION OF 1-(2-ETHYLHEXYLAMINO)-3-PHENOXY-2-PROPANOL

To 2 mols (258 gm.) of refluxing 2-ethylhexylamine (B.P. 155–165° C.) is added 1 mol (150 gm.) of glycidyl phenyl ether over a period of 3½ hours. After all of the glycidyl phenyl ether is added, refluxing is continued for an additional two hours at which time the mixture is allowed to cool to room temperature. Unreacted 2-ethylhexylamine is removed by vacuum distillation at 30° C. at 1–2 mm. Hg. The resultant product is then vacuum distilled at 190°–193° C. at 3–4 mm. Hg to yield a yellowish heavy oil as the desired product. Chemical analysis of this product indicates preparation of the desired $C_{17}H_{29}NO_2$ and is as follows:

| Element | Percent Actual | Percent Calculated |
|---|---|---|
| C | 73.4 | 73.2 |
| H | 10.45 | 10.4 |

This product has a refractive index of $N_d^{20}$ 1.5038.

Part B

To illustrate the effectiveness of the product of Part A as a fungicide, glass slide germination tests are conducted against the fungi *Alternaria oleracea* and *Sclerotinia fructicola* whereby the product of Part A in aqueous solutions at concentrations of 1000, 100, 10 and 1 p.p.m., respectively, are examined for their ability to inhibit germination of spores from 7–10 day old cultures of these fungi. These concentrations refer to initial concentrate before diluting 4 volumes with one volume of spore stimulant and spore suspension. Germination records are taken after 20 hours, each suspension at 22° C. by counting 100 spores. The results are reported in terms of ED 50 values, i.e., the concentration which inhibits germination of one-half the spores in the test drops. Using this procedure, it is observed that the product of Part A exhibits an ED 50 value of 10–100 p.p.m., against both types of fungi, thus indicating a high degree of fungicidal activity.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling insects and microorganisms which comprises contacting said pests with a pesticidal composition containing as an active ingredient an alkylaminophenoxy-2-propanol of the structure

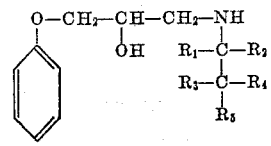

wherein $R_1$, $R_2$, $R_3$, $R_4$ and $R_5$ are selected from the group consisting of hydrogen atoms and lower alkyl radicals, at least one of which is alkyl.

2. The method of controlling fungus growth which comprises contacting said fungus with a fungicidal composition containing as an active ingredient a compound of the structure

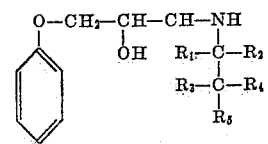

wherein $R_1$, $R_2$, $R_3$, $R_4$ and $R_5$ are selected from the group consisting of hydrogen atoms and lower alkyl radicals, at least one of which is alkyl.

3. The method of controlling fungus growth which comprises contacting said fungus with a fungicidal composition containing as an active ingredient a compound having the formula

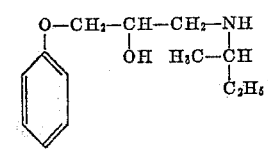

4. The method of controlling fungus growth which comprises contacting said fungus with a fungicidal composition containing as an active ingredient a compound having the formula

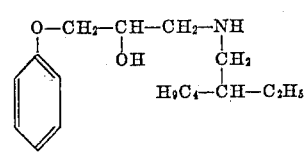

5. The method of controlling insect growth which comprises contacting said insects with an insecticidal composition containing as an active ingredient a compound of the structure

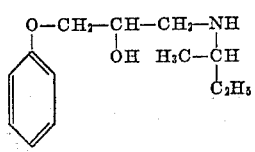

References Cited in the file of this patent

King: U.S. Dept. Agr. Handbook No. 69, May 1954, p. 282.